Dec. 22, 1942.  D. C. SCOTT  2,306,111
TESTING MACHINE
Filed Feb. 3, 1940   3 Sheets-Sheet 1

INVENTOR.
David C. Scott
BY Barlow & Barlow
ATTORNEYS.

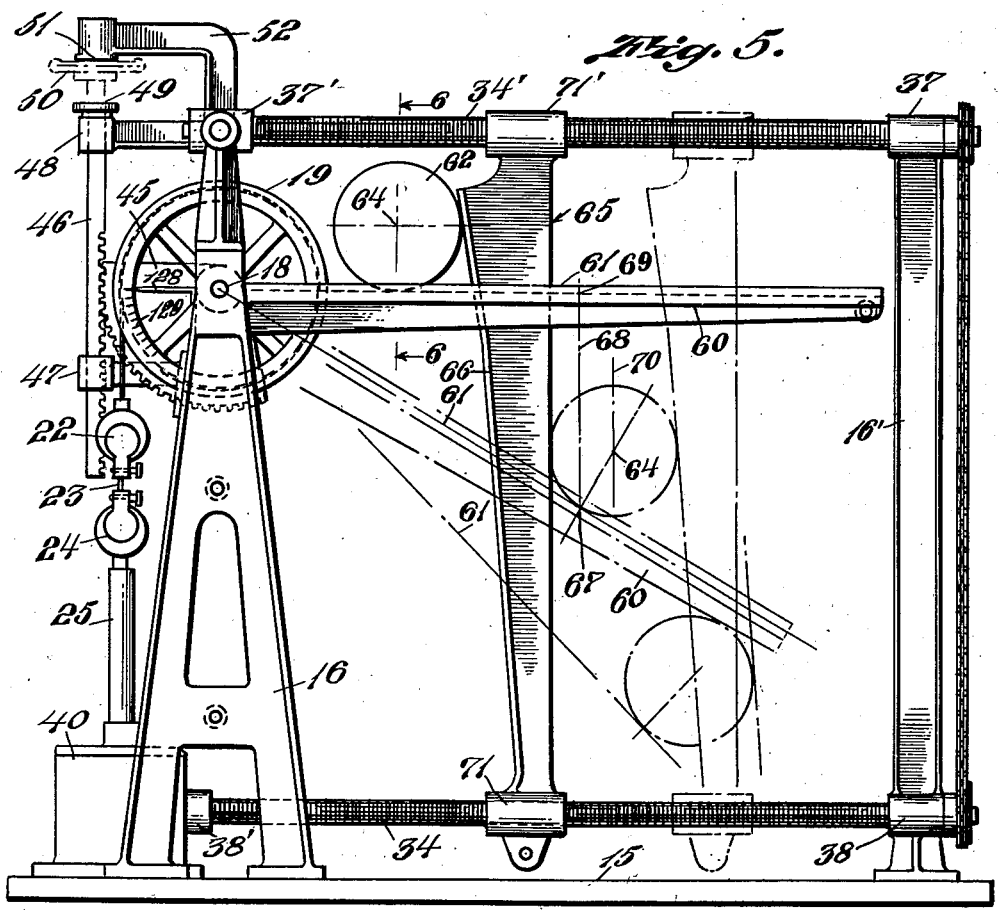

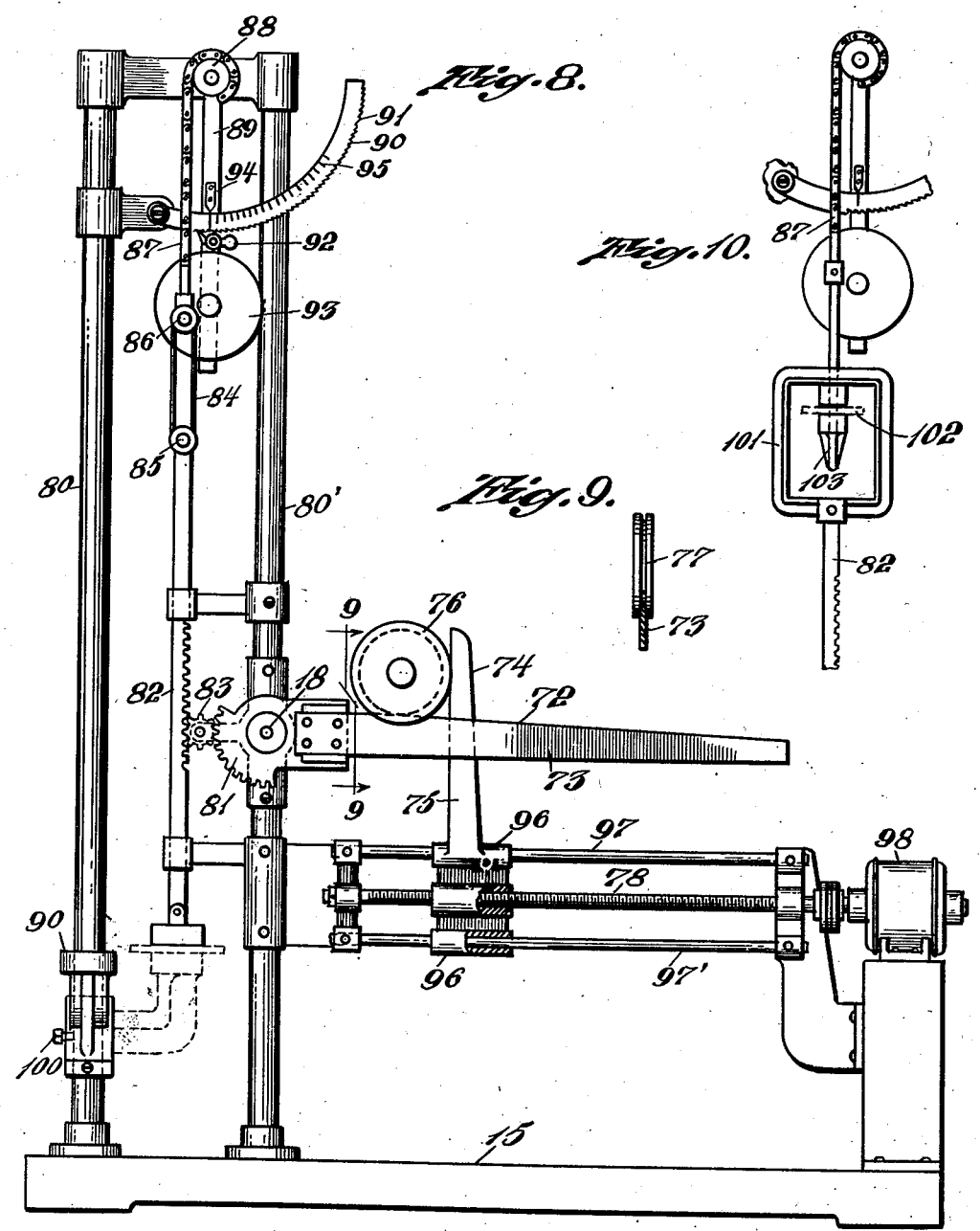

Patented Dec. 22, 1942

2,306,111

UNITED STATES PATENT OFFICE 2,306,111

TESTING MACHINE

David C. Scott, Providence, R. I., assignor to Henry L. Scott Company, a corporation of Rhode Island Application February 3, 1940, Serial No. 317,136

13 Claims. (Cl. 265—16)

This invention relates to a machine for load measurement, more particularly for exerting known stresses upon a test specimen and measuring the resulting strains, and has particular application to the class of machines frequently referred to as constant load rate testers.

One of the objects of this invention is to provide a machine in which the load is applied by means of a weight acting through a lever whereby the factor entering into the quantity of load applied is the product of the mass and the distance through which the mass acts about the pivotal point or fulcrum of the lever, and to provide for one of said factors being constant and the other factor changing the same amount per unit of time.

Another object of the invention is to maintain the mass factor constant but to vary the length of the lever or distance of the center of the mass from the center of the pivot or fulcrum of the lever at a constant rate per unit of time whereby the change in load rate will be constant.

Another object of the invention is the simplicity of the control of the position of the center of the mass in changing its position to vary the distance through which it acts about the pivot or fulcrum of the lever for application of the load on the specimen.

With these and other objects in view, the invention consists of certain novel features of construction, as will be more fully described and particularly pointed out in the appended claims.

In the accompanying drawings:

Fig. 1 is an elevation of an apparatus designed for applying load in accordance with my invention;

Fig. 2 is a section on line 2—2 of Fig. 1;

Fig. 3 is a fragmental view showing a modified form of applying load to the specimen;

Fig. 4 is a fragmental elevation looking on line 4—4 of Fig. 3;

Fig. 5 is an elevation of a modified form of machine otherwise similar to Fig. 1 and showing an arrangement for the application of load both in tension and compression;

Fig. 6 is a section on line 6—6 of Fig. 5;

Fig. 7 is a fragmental detail illustrating the application of load to a different form of specimen;

Fig. 8 is an elevation of a different form of machine illustrating the different manner of applying load to a specimen either in compression or tension;

Fig. 9 is a sectional view on substantially line 9—9 of Fig. 8;

Fig. 10 is a fragmental view of a different form of application of load to the specimen in the structure shown in Fig. 8.

It is desirable in the use of load measurement to provide a machine whereby change in the specimen such as elongation thereof will be taken up automatically and there will be applied to the specimen a constant change in load per unit of time; and in order to provide for this result I have arranged a lever arm through which a weight applies load, the total load being the product of the mass or weight and the distance to the center of this mass from the pivot or fulcrum of the lever, the lever being so arranged that it will swing to take up any elongation or change in the specimen as such, which occurs without affecting the change in load per unit of time, and thus a constant load rate is at all times provided for. In a machine of this character, inasmuch as the load applied equals a product of two factors, one being the mass of the weight and the other the distance of the weight from the fulcrum, I maintain one of these factors constant and vary the other factor at a constant rate so that the product of the factors will be a constant rate, indicating the load applied to the specimen; and I have illustrated means for maintaining either the weight factor constant and the other variable by a controlled rate, and where the mass is maintained constant, various means for controlling the shifting of the center of the mass are provided for.

In Figs. 1 to 10 inclusive of the drawings, I have illustrated the weight as constant and have shown various means for controlling the position of this weight along a beam to vary the leverage of this constant mass in its application of load to the specimen.

In Figs. 1 to 10, I have illustrated several means of controlling the position of the constant mass with reference to the center of the pivot or fulcrum of the beam through which it acts. In Fig. 1, I have positioned the center of the mass in the same horizontal plane as the center of the pivot about which it acts when the beam through which it acts is in a horizontal plane. In this way the function of the mass or weight is always directly proportional to the cosine of the angle which a line connecting the center of the pivot and the center of the weight bears to the horizontal; or, in other words, directly proportional to the distance in which the line of the action of gravity through the center of the weight is from the center of the pivot of the beam through which the weight acts. In Fig. 5 inasmuch as the center of mass is above or located at one side of a horizontal plane passing through the center of pivot of the beam when the beam is horizontal, a cam for controlling the position of the weight on the beam must necessarily be provided if the constant relationship of the point of application of the weight to the beam is to be maintained according to the cosine law above indicated, and in this showing I have illustrated the cam surface as provided upon the controller itself instead of the weight controller having a vertical straight edge.

With reference to the drawings in more detail, the base of the various apparatus illustrated is designated 15; the upright frame is designated 16, 16'. A beam 17 is pivoted as at 18 upon this frame 16 which is fixed to rotate with a drum 19 co-axial with the pivot of the beam and about which there is trained a flexible element 20 secured at 21 to the drum and attached to the clamp 22 which engages one end of a specimen 23 held at its opposite end by means of a clamp 24 which is supported by a standard 25. The beam 17 consists of a pair of spaced members which support between them a weight 26, comprising two cylindrical members mounted upon a shaft 27 and held in spaced relation by a cylindrical member 28.

This weight unit consisting of these several parts 26, 27, and 28 is free to roll along the upper surface 29 of the beam throughout substantially its length. The center of the mass of the weight 26 will be the center of the shaft 27, and when the surface 29 of this beam is horizontal, the center of the pivot for the beam 18 and the center of shaft 27 (or center of mass) will be in a horizontal plane parallel to the surface 29. It will be apparent that as the weight shifts its position outwardly along the beam 17 away from the pivot 18, the turning moment on the drum 19 will be increased.

This beam 17 will tilt in accordance with the elongation of the specimen 23 as the load is applied, but the measure of the load will always be the product of the mass of the weight 26 and the distance measured along a horizontal line designated 30 between the center of the pivot 18 and the center of the mass or weight 26, and this will be true regardless of the inclination of the beam and the position of the weight thereon. For instance, I have illustrated in dot-dash lines the weight as located at a position where the beam is approximately at an angle of thirty degrees to the horizontal. The line 31 joins the center of the pivot 18 and the center of the shaft 27, which is the center of the mass or weight 26. The cosine of this angle will be represented by the line 30 drawn horizontally through the center of the pivot 18 and graphically represents the cosine of the angle at unity radius which the line 31 makes with the horizontal, which is the distance through which the mass acts. It thus becomes apparent that if I can move the weight so as to increase its distance along the horizontal line 30 from the center 18 in uniform increments per unit of time, I will have a constant rate of load increase.

I accomplish the above uniformity by the provision of a weight controller designated generally 32 consisting of a member or crosshead having a slot 33 which will engage either side of the shaft 27 so as to positively move it in response to movement of this member 32, and I move this member 32 by means of threaded shafts 34, 34' which are connected to rotate in unison by a sprocket chain 35 trained over sprocket gears 36, 36', these shafts being mounted in suitable bearings 37, 37', 38, 38' at the upper and lower ends of the frames 16, 16'. The shaft 34 is operated at uniform rate of revolutions per minute, such as by a synchronous motor, or through a pulley 39 and through suitable gearing in casing 40, not illustrated in detail. Thus, the shafts 34, 34' may be operated in unison through threaded sleeves 41, 41' at the opposite ends of the member 32 for positively controlling the position of the weight 26 to change the center of its mass in the same proportion that the member 32 moves to change the distance along the line 30 of the weight in its action about the pivot 18.

This particular manner of applying the test upon the specimen may be varied, a direct pull in tension being illustrated in Fig. 1, whereas bending action is illustrated in Fig. 3 where the specimen 23' is engaged at spaced points by members 42 mounted on standard 25 and at a single point between these members 42 as at 43 which is attached by a stirrup to the flexible element 20.

In Fig. 5 I have illustrated a very similar general arrangement of the machine and the corresponding parts are similarly designated by reference numerals. In this case, however, I have illustrated a gear segment 45 as also fixed upon the drum 19 which gear segment engages a rack 46 guided as at 47 and 48 from the frame 16 and provided with a head 49 to apply a stress in compression upon a specimen 50 between this head and a fixed anvil 51 mounted on an extension 52 of the frame 16. When a bending test is desired, a bracket 53 may be provided from the frame 16 with a specimen 54 mounted beneath some restraining bar 55 and clamped as at 56 by set screw 57 to the swinging end of the beam which is rocked.

In the showing in Figs. 5, 6 and 7, the beam 60 has the engaging surface of its runway 61 on a line passing through the center 18 of the pivot for the beam so that when the beam is in horizontal position this surface will pass through the center 18 and any weight, such as 62, supported by this surface will have its center of mass above the horizontal plane of the pivot 18. This beam 60 has spaced portions which are rabbeted as at 63, while the weight 62 is of cylindrical form and is free to roll along the beam throughout its extent, while the weight is prevented from axial motion by engagement with the rabbet 63.

Inasmuch as the center of mass 64 of this weight 62 is above the center line, it will be necessary to provide some compensating means to cause this center to maintain the desired relationship for constant load rate increase, and in order to provide for this, the controller 65 is formed with a cam surface 66 which will allow the weight to move additional increments along the beam 60. As the elongation of the specimen takes place and the beam tilts, the weight engages the beam at distances nearer the end thereof, for instance, as illustrated in Fig. 5 with the beam at substantially thirty degrees. In this position the weight will be applied to the surface 61 at the point 67 and not vertically below the center 64 as is the case when the weight is supported in a horizontal position as shown in full lines. Thus, the actual distance through which the weight is applied is the cosine of the angle made between the line 61, which represents the surface of the beam contacted, and the line of the horizontal which would be the plane of the line 61 shown when the beam is in full lines or the distance through which the weight acts would be the distance from the center of the pivot to the junction of the perpendicular 68 with the line 61 or point 69 on the horizontal. The increase allowed by the cam surface over a perpendicular surface of the controller is represented between the lines 68 and the line 70 which must be provided in order that the application of the center of mass to the beam maintain a relationship proportional to a uniform advance by the screws 34, 34' which pass through the threaded sleeves 71, 71' of the controller 65.

In Fig. 8 I have illustrated the same general principle as illustrated in Fig. 5 but in this case I have provided the cam surface 72 upon the beam 73, while the controller 74 has a vertical surface 75 for controlling the weight 76 grooved as at 77 to fit upon and be guided by the beam 73. In this case, the beam is pivoted as at 18 and the beam is illustrated in horizontal position while its surface along which the weight moves is inclined on a cam in order to provide for increase in movement of the weight in order that its center of mass may act upon the beam at points which are proportional to the uniform advance of the controller 75 by means of screw 78.

The particular apparatus illustrated in Fig. 8 shows some further variations. In this case, the frame 80, 80' supports the beam 73 in pivotal relation about the center 18, while a segmental gear 81 is provided to drive the rack 82 through pinion 83 so as to apply stress upon specimen 84 engaged by clamp 85, which specimen is also engaged at its opposite end by clamp 86 supported by sprocket chain 87 trained over drum 88 and having fixed with this drum an arm 89 movable over a segment 90 and provided with ratchet teeth 91 to be engaged by the pawl 92, this arm 89 carrying a suitable weight 93 to resist the pull on the specimen, while there is a pointer 94 to indicate the datum line of the calibrations upon the segment 90 which calibrations are designated 95.

The controller 75 is provided with a cross head 96 slidable on guides 97, 97' and advanced uniformly by screw 78 through synchronous motor 98, or other suitable means. An anvil 99 is adjustably supported by means of set screw 100 on the frame 80 so that tests in compression may be utilized for the same mechanism. A bending test may be also provided by attaching a yoke 101 to the upper end of the rack 82 to engage the middle of a specimen 102, while a stirrup 103 is provided for engaging either side of this middle portion and is attached to the sprocket chain 87.

In Fig. 5, I have illustrated the pointer 128 as fixed to the stand 16, while the calibrated arc 129 is provided upon the drum 19 which moves with the beam 17.

I claim:

1. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam, whereby the turning moment of the beam is equal to the product of two factors one of which is the said distance and the other of which is the mass of said weight, and means for moving the weight relative to the beam to vary the distance factor, and a constant speed motor to operate said means.

2. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam whereby the turning moment of the beam is equal to the product of two factors one of which is the said distance and the other of which is the mass of said weight, and means to shift the weight along the beam so regulated as to uniformly change the effective leverage arm from the center of pivot of the beam.

3. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam whereby the turning moment of the beam is equal to the product of two factors one of which is the said distance and the other of which is the mass of said weight, means to position the center of mass in the same horizontal plane with the pivot of the beam when said beam is also in a horizontal position means to shift the weight along the beam so regulated as to uniformly change the effective leverage arm from the center of pivot of the beam.

4. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam, whereby the turning moment of the beam is equal to the product of two factors one of which is the said distance and the other of which is the mass of said weight, a pair of horizontal guides, and a crosshead movable along said guides and itself provided with a vertical guiding surface to direct the movement of said weight relatively along said beam.

5. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam, whereby the turning moment of the beam is equal to the product of two factors one of which is the said distance and the other of which is the mass of said weight, a pair of spaced horizontal guides, and a crosshead movable along said spaced guides and itself provided with a vertical slot having a guiding surface to engage and direct the movement of said weight relatively along said beam.

6. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam, whereby the turning moment of the beam is equal to the product of two factors one of which is the said distance and the other of which is the mass of said weight, a pair of threaded horizontal guides, and a crosshead movable along said guides by means of threaded engagement therewith and itself provided with a vertical guiding surface to direct the movement of said weight relatively along said beam.

7. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam, whereby the turning moment of the beam is equal to the product of two factors one of which is the said distance and the other of which is the mass of said weight, a pair of threaded horizontal guides, and a crosshead movable along said guides by means of threaded engagement therewith and itself provided with a vertical slot perpendicular to said guides to direct the movement of said weight.

8. In an apparatus of the character described, means for applying a load to the specimen tested through a rockable beam comprising a beam rockable about a pivot to incline the same with reference to a horizontal, a weight having rolling engagement with said beam with its center of mass acting through a certain leverage distance from the pivot of said beam, whereby the turning moment of the beam is equal to the product of two factors one of which is the said distance and the other of which is the mass of said weight, a pair of horizontal guides, and a crosshead movable along said guides to vary its position from the pivot of said beam, said crosshead engaging said weight to control its movement along said beam.

9. In an apparatus of the character described, means for applying a load to the specimen tested through a rockable beam comprising a beam rockable about a pivot to incline the same with reference to a horizontal, a weight having rolling engagement with said beam with its center of mass acting through a certain leverage distance from the pivot of said beam, whereby the turning moment of the beam is equal to the product of two factors one of which is the said distance and the other of which is the mass of said weight, a pair of horizontal guides, a crosshead movable along said guides to vary its position from the pivot of said beam, said crosshead engaging said weight to control its movement along said beam, and means to move said crosshead to uniformly vary the effective leverage distance of the application of the weight to the beam.

10. In an apparatus of the character described, means for applying a load to the specimen tested through a rockable beam comprising a beam rockable about a pivot to incline the same with reference to a horizontal, a weight having rolling engagement with said beam with its center of mass acting through a certain leverage distance from the pivot of said beam, whereby the turning moment of the beam is equal to the product of two factors one of which is the said distance and the other of which is the mass of said weight, a pair of horizontal threaded guides, a crosshead movable along said guides by means of threaded engagement therewith to vary its position from the pivot of said beam, said crosshead having a slot into which a portion of the weight extends to control the rolling movement of the weight along said beam, and means to uniformly turn both threaded guides in unison to vary the effective leverage distance of the application of the weight to the beam.

11. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam whereby the turning moment of the beam is equal to the product of two factors one of which is the said distance and the other of which is the mass of said weight, cam surfaces engaging said weight to shift the weight along the beam at a constant rate of change from the center of the pivot of the beam.

12. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam whereby the turning moment of the beam is equal to the product of two factors one of which is the said distance and the other of which is the mass of said weight, a controller for said weight having a cam surface engaging said weight to permit movement of the weight as the beam tilts and maintain the point of application of force to the beam at a uniformly changing distance from the center of the pivot of the beam.

13. In an apparatus of the character described, means for applying a load to the specimen tested through a rockable beam comprising a beam rockable about a pivot to incline the same with reference to a horizontal, a weight applied to said beam with its center of mass acting through a certain leverage distance from the pivot of said beam whereby the turning moment of the beam is equal to the product of two factors one of which is the said distance and the other of which is the mass of said weight, a weight controller, said beam being provided with a cam surface to control movement of the weight to maintain the point of application of force to the beam at a uniformly changing distance from the center of the pivot of the beam as the beam tilts.

DAVID C. SCOTT.